United States Patent
Ihara et al.

(10) Patent No.: US 6,942,820 B2
(45) Date of Patent: Sep. 13, 2005

(54) DIMETHYLPOLYSILOXANE COMPOSITION

(75) Inventors: Toshiaki Ihara, Gunma (JP); Sinobu Sato, Annaka (JP); Ichiro Ono, Gunma (JP); Hiroshi Nakayama, Annaka (JP); Masahiko Minemura, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/832,265

(22) Filed: Apr. 27, 2004

(65) Prior Publication Data

US 2004/0214931 A1 Oct. 28, 2004

(30) Foreign Application Priority Data

Apr. 28, 2003 (JP) ........................................ 2003-123355
Apr. 13, 2004 (JP) ........................................ 2004-118319

(51) Int. Cl.$^7$ ................................................. C09K 5/10
(52) U.S. Cl. ........................... 252/69; 252/67; 252/78.3
(58) Field of Search ............................ 252/67, 69, 78.3

(56) References Cited

U.S. PATENT DOCUMENTS

| | | | | |
|---|---|---|---|---|
| 5,273,670 A | * | 12/1993 | Endres et al. | 508/208 |
| 5,562,945 A | * | 10/1996 | Hijino et al. | 427/164 |
| 5,773,403 A | * | 6/1998 | Hijino et al. | 510/411 |
| 5,925,338 A | * | 7/1999 | Karassik et al. | 424/65 |
| 6,153,525 A | * | 11/2000 | Hendricks et al. | 438/692 |
| 6,438,990 B1 | * | 8/2002 | Hertling | 62/434 |

FOREIGN PATENT DOCUMENTS

| | | |
|---|---|---|
| JP | 2001-262168 A | 9/2001 |
| RU | 1004410 A | 3/1983 |

* cited by examiner

*Primary Examiner*—Margaret G. Moore
(74) *Attorney, Agent, or Firm*—Birch, Stewart, Kolasch & Birch, LLP

(57) ABSTRACT

A dimethylpolysiloxane composition comprising at least two dimethylpolysiloxanes selected from dimethylpolysiloxanes represented by formula (1) or formula (2),

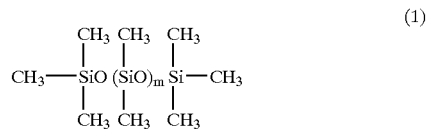

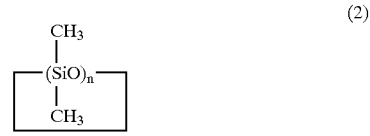

wherein m is an integer with $0 \leq m \leq 10$ and n is an integer with $3 \leq n \leq 10$, one of said at least two dimethylpolysiloxanes is dodecamethylpentasiloxane contained in an amount of 15 to 95 wt % based on a total weight of the composition, and the composition has a moisture content of at most 50 ppm based on the total weight of the composition.

4 Claims, No Drawings

DIMETHYLPOLYSILOXANE COMPOSITION

CROSS REFERENCE

This application claims benefits of Japanese Patent application No. 2003-123355 filed on Apr. 28, 2003, and Japanese Patent application No. 2004-118319 filed on Apr. 13, 2004, the contents of which are hereby incorporated by reference.

FIELD OF THE INVENTION

The present invention relates to a composition which can be used as a refrigerant and does not freeze, and is fluid with a low viscosity even at a temperature so low as −100 degrees C. The composition is safe and can be produced at low cost.

DESCRIPTION OF THE PRIOR ART

A silicone oil is used as a refrigerant for various industrial apparatuses because it is physiologically and ecologically highly safe; it has a relatively low pour point and a freezing point; and it shows a small increase in viscosity with decreasing temperature. Especially, a linear dimethylpolysiloxane having a viscosity of from 1 to 10 mm$^2$/s at 25 degrees C. is widely used as a refrigerant.

Pour point and freezing point data of a dimethylpolysiloxane having a low viscosity and good low-temperature properties are varied among silicone producers as can be seen between the technical information sheet, "Performance data of silicone oil KF96", Shin-Etsu Chemical Co., Ltd, and the product catalogue, "200 Fluid Typical Properties", Dow Corning Co. Reasons for this variance may be difficulty in measurements of pour point and freezing point at a very low temperature, and influence of moisture remaining in the dimethylpolysiloxane on pour point and freezing point. At present, the lowest applicable temperature of a dimethylpolysiloxane as an industrial refrigerant is not lower than a temperature of from −80 to −90 degrees C.

SUMMARY OF THE INVENTION

Recently, there arise needs for an industrial refrigerant which does not freeze to have steady fluidity even at a temperature of −100 degrees C. or lower. The present inventors dehydrated various dimethylpolysiloxanes having low viscosity and precisely measured their pour points and freezing points. It has been found that dodecamethylpentasiloxane has the best low-temperature properties against the data so far reported.

However, dodecamethylpentasiloxane has drawbacks. One drawback is high production cost. Dodecamethylpentasiloxane is produced by the following process:

1) mixing a mixture of cyclic siloxanes produced by subjecting dimethyldichlorosilane to hydrolysis and condensation reaction, and a siloxane of the formula, (CH$_3$)$_3$SiOSi(CH$_3$)$_3$, produced by subjecting trimethyldichlorosilane to a hydrolysis and condensation reaction in a predetermined ratio, 2) subjecting the mixture obtained in the step 1) to a redistribution reaction in the presence of an acid catalyst such as sulfuric acid and a solid acid catalyst to produce a mixture of various siloxanes, and 3) isolating dodecamethylpentasiloxane from the mixture of various siloxanes by a fractional distillation.

The high production cost is due to low production per hour in the fractional distillation process of step 3).

Another drawback is that dodecamethylpentasiloxane has a viscosity of 2 mm$^2$/s at 25 degrees C. For an industrial refrigerant application, a dimethylpolysiloxane having a viscosity lower than 2 mm$^2$/s is preferred because such dimethylpolysiloxane has higher thermal conductivity, higher fluidity, and lower friction torque.

Therefore, a refrigerant is desired which has as good low-temperature properties as dodecamethylpentasiloxane, but has a lower viscosity and lower production cost than dodecamethylpentasiloxane.

The present inventors have found that dodecamethylpentasiloxane has an interesting property that it does not show any melting peak in scanning differential calorimetry (DSC). This may be because dodecamethylpentasiloxane has a three-dimensional structure difficult to form a crystal. It has also been found that a mixture of dodecamethylpentasiloxane with an other dimethylpolysiloxane does not show any melting peak as far as the mixture contains at least 15 wt % of dodecamethylpentasiloxane based on a total weight of the mixture.

In addition, it has been found with surprise that such a mixture has a freezing point and a pour point both lower than −100 degrees C. Further, such a mixture containing at least 5 wt % of the other dimethylpolysiloxanes having a viscosity lower than 2 mm$^2$/s at 25 degrees C. was found to have a viscosity lower than 2 mm$^2$/s at 25 degrees C., as well as a freezing point and a pour point lower than −100 degrees C.

Thus, the present invention is a dimethylpolysiloxane composition comprising at least two dimethylpolysiloxanes selected from dimethylpolysiloxanes represented by formula (1) or formula (2),

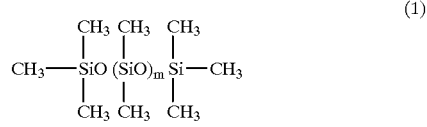

wherein m is an integer with $0 \leq m \leq 10$ and n is an integer with $3 \leq n \leq 10$,
one of said at least two dimethylpolysiloxanes is dodecamethylpentasiloxane contained in an amount of 15 to 95 wt % based on a total weight of the composition, and the composition has a moisture content of at most 50 ppm based on the total weight of the composition.

Preferred embodiments of the above invention are as follows.

The dimethylpolysiloxane composition described above, wherein the composition has a viscosity of 2 mm$^2$/s or smaller at 25 degrees C. and a viscosity of 300 mm$^2$/s or smaller at −100 degrees C.

The dimethylpolysiloxane composition described above, wherein the composition has a freezing point of −110 degrees C. or lower.

The composition described above, wherein the composition comprises at least 1 wt %, based on the total weight of the composition, of the cyclic dimethylpolysiloxane represented by the formula (2).

The present invention relates also to a refrigerant for an apparatus comprising the composition described above.

DESCRIPTION OF THE PREFERRED EMBODIMENTS

The present invention is a dimethylpolysiloxane composition comprising at least two dimethylpolysiloxanes selected from dimethylpolysiloxanes represented by formula (1) or formula (2). In the formulae, m is an integer with $0 \leq m \leq 10$, preferably $0 \leq m \leq 6$, and n is an integer with $3 \leq n \leq 10$, preferably $4 \leq n \leq 8$. Examples of the dimethylpolysiloxane include linear siloxanes such as hexamethyldisiloxane, octametyltrisiloxane, decamethyltetrasiloxane, dodecamethylpentasiloxane, tetradecamethylhexasiloxane, hexadecamethylheptasiloxane, octadecamethyloctasiloxane, and eicosarmethylnonasiloxane; cyclic siloxanes such as hexamethylcyclotrisiloxane, octamethylcyclotetrasiloxane, decamethylcyclopentasiloxane, dodecamethylcyclohexasiloxane, and tetradecamethylcycloheptasiloxane.

In the aforesaid production process of dodecamethylpentasiloxane, dimethyldichlorosilane is subjected to hydrolysis and a condensation reaction to obtain a mixture of cyclic siloxanes of the formula (2). A reaction product of a redistribution reaction of the mixture of cyclic siloxanes with $(CH_3)_3SiOSi(CH_3)3$ is a mixture of the siloxanes or the formulae (1) and (2). Next, in isolating dodecamethylpentasiloxane from the mixture, separation of dodecamethylpentasiloxane from octamethyltrisiloxane and decamethyltetrasiloxane takes long time because the boiling points of octamethyltrisiloxane and decamethyltetrasiloxane are close to that of dodecamethylpentasiloxane. This results in a low production rate and high production cost.

The present composition is characterized in that dimethylpolysiloxanes other than dodecamethylpentasiloxane are contained in such an amount that the low-temperature properties of dodecamethylpentasiloxane are not adversely affected. This is based on the present inventors' finding that dodecamethylpentasiloxane has a peculiar property of showing no melting peak in DSC and its low-temperature properties are maintained in a mixture with other dimethylpolysiloxanes in a certain amount. Such other dimethylpolysiloxanes include other fractions obtained in simple distillations and dimethylpolysiloxanes distilled off together with dodecamethylpentasiloxane under weaker distillation conditions than precision fractional distillation of dodecamethylpentasiloxane. On account of these dimethylpolysiloxanes, the present composition can be obtained at a significantly lower cost than that of dodecamethylpentasiloxane, and makes use of the good low-temperature properties of dodecamethylpentasiloxane.

In the composition, dodecamethylpentasiloxane is contained in an amount of from 15 to 95 wt %, preferably from 20 to 70 wt %, based on a total weight of the composition. If the amount is below the aforesaid lower limit, a composition may freeze or have a viscosity larger than 300 mm$^2$/s at −100 degrees C. If the amount exceeds the aforesaid upper limit, a production rate in distillation process is lower, leading to higher production cost.

Among the aforesaid dimethylpolysiloxanes described above, preferred dimethylpolysiloxanes other than dodecamethylpentasiloxane include hexamethyldisiloxane, octamethyltrisiloxane, decamethyltetrasiloxane, tetradecamethylhexasiloxane, octamethylcyclotetrasiloxane, decamethylcyclopentasiloxane, and dodecamethylcyclohexasiloxane, because of their low viscosity and good flow property.

Preferably, the composition comprises at least 1 wt %, more preferably at least 5 wt %, of the cyclic dimethylpolysiloxane of the formula (2) in the viewpoint of production cost.

The present composition has a moisture content of at most 50 ppm, preferably at most 30 ppm. A moisture content larger than 50 ppm causes a pour point to rise, so that a composition may not attain the aimed flow property and viscosity at a temperature below −100 degrees C. without freezing. The moisture can be removed by any known method such as purging moisture by blowing dry nitrogen gas into the composition.

The present dimetylpolysiloxane composition has a viscosity at 25 degrees C. of 2 mm$^2$/s or smaller, preferably 1.7 mm$^2$/s or smaller, and a viscosity at −100 degrees C. of 300 mm$^2$/S or smaller, preferably 100 mm$^2$/s or smaller. A composition having a viscosity at 25 degrees C. of higher than 2 mm$^2$/s is undesirable because such a composition highly likely has a viscosity at −100 degrees C greater than 300 mm$^2$S. A composition having a viscosity at 25 degrees C. of 2 mm$^2$/s or smaller, but having a viscosity at −100 degrees C. greater than 300 mm$^2$/S is undesirable, because such a composition may show drastic change in properties, such as thermal conductivity, specific heat, flow property and friction torque, at different temperature.

Industrial apparatuses in which the present composition can be suitably used include pharmaceuticals production units, freezers used in the agricultural, stock raising or fishery industry, ice making and freezing warehouses, super low temperature refrigerators, adsorption refrigerators in atomic power plants, freezers for storing frozen foods or processed marine products, freezers in freezing carriers, helium liquefiers, cooling systems of helical superconducting magnets, cryoprobes, i.e., clinical cryogenic spot cooling machine, cryosurgery apparatuses for cancer treatment, cooling systems of superconducting magnets to float a linear motor train, cooling systems of hydrogen fuel liquefiers of space rockets, and vacuum freeze-driers used in the drug or food industry, but are not limited to these.

EXAMPLES

The present invention will be explained with reference to the following non-limiting Examples and Comparative Examples, but not limited thereto. The amounts are represented in wt % unless otherwise specified.

The properties of the dimethylpolysiloxanes shown in Table 1 were measured after dehydrating each dimethylpolysiloxane to a moisture content to the value specified in Table 1.

The following dimethylpolysiloxanes were used.

$M_2$: KF-96 having a viscosity of 0.65 mm$^2$/s, ex Shin-Etsu Chemical Co., Ltd.

$M_2D$: KF-96 having a viscosity of 1 mm$^2$/s, ex Shin-Etsu Chemical Co., Ltd.

$M_2D_2$: KF-96 having a viscosity of 1.5 mm$^2$/S, ex Shin-Etsu Chemical Co., Ltd.

$M_2D_3$: KF-96 having a viscosity of 2 mm$^2$/s, ex Shin-Etsu Chemical Co. Ltd.

$M_2D_4$, $M_2D_5$, $M_2D_6$: prepared from a mixture of KF-96 having a viscosity of 2 mm²/s and KF-96 having a viscosity of 2 mm²/s, ex Shin-Etau Chemical Co., Ltd.
D4: KF-994, ex Shin-Etsu Chemical Co., Ltd.
D5: KF-995, ex Shin-Etsu Chemical Co., Ltd.

The symbols "M", "D", D4 and D5, represent the following chemical structures.

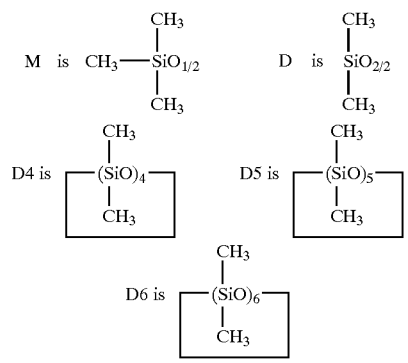

The properties were determined according to the following methods.

Pour Point

A pour point was measured according to the Japanese Industrial Standards, JIS-K-2269. A composition was cooled in a cooling bath containing liquid nitrogen. A moisture content of each composition was adjusted by blowing nitrogen gas via a glass pipette in 45 g of the composition for 30 minutes. The moisture content of the composition was measured with a Karl-fisher moisture meter.

Freezing Point

A freezing point was measured according to JIS-K-0065. A bath containing liquid nitrogen was used. A moisture content of each composition was adjusted in the same manner as described above.

Viscosity

A viscosity at 25 degrees C or at −100 degrees C. was measured according to JIS-Z-8803. A compositions was cooled in a cooling bath containing liquid nitrogen to measure the viscosity at −100 degrees C. In Table 1, the abbreviation, "NG", means that the viscosity at −100 degrees C. could not be measured.

TABLE 1

Properties of the dimethylpolysiloxanes

| dimethyl-polysiloxane | viscosity (25° C. mm²/s) | viscosity (−100° C. mm²/s) | pour point (° C.) | freezing point (° C.) | moisture content (ppm) |
|---|---|---|---|---|---|
| $M_2D_3$* | 2.0 | 100 | −120 | −120 | 20 |
| $M_2D_3$** | 2.0 | 336 | −107 | −107 | 50 |
| $M_2D_3$*** | 2.0 | NG | −86 | −87 | 200 |
| $M_2$ | 0.65 | NG | −77 | −70 | 20 |
| $M_2D$ | 1.0 | NG | −100 | −90 | 20 |
| $M_2D_2$ | 1.5 | NG | −95 | −95 | 20 |
| $M_2D_4$ | 2.6 | NG | −90 | −88 | 20 |
| $M_2D_5$ | 3.2 | NG | −70 | −70 | 20 |
| $M_2D_6$ | 3.9 | NG | −67 | −67 | 20 |
| D4 | 2.3 | NG | 17 | 18 | 20 |

TABLE 1-continued

Properties of the dimethylpolysiloxanes

| dimethyl-polysiloxane | viscosity (25° C. mm²/s) | viscosity (−100° C. mm²/s) | pour point (° C.) | freezing point (° C.) | moisture content (ppm) |
|---|---|---|---|---|---|
| D5 | 3.9 | NG | −40 | −40 | 20 |
| D6 | 6.6 | NG | −85 | −85 | 20 |

As shown in Table 1, the pour point and the freezing point rise with the increasing moisture content.

Example 1

A reaction product obtained by subjecting trimethylchlorosilane to a hydrolysis and condensation reaction and a reaction product obtained by subjecting dimethyldichlorosilane to a hydrolysis and condensation reaction were mixed at a molar ratio of 2:3. The mixture was then placed in a 5 m³ SUS reactor and subjected to a redistribution reaction in the presence of a solid catalyst, a sulfonated styrene/divinylbenzene copolymer, at a constant temperature of 70 degrees C. The reaction product obtained was subjected to a simple distillation at a temperature of 105 degrees C. and a pressure of 2700 Pa. The bottom product of the distillation was then subjected to a simple distillation at a temperature of 105 degrees C. and a pressure of 400 Pa to obtain a composition of Example 1. The composition was analyzed by capillary gas chromatography with a capillary column, DB-1701, a temperature increase rate of 15 degrees C./min from 50 degrees C. to 300 degrees C.

Example 2

The composition of Example 2 was prepared in the same manner as in Example 1 except that the second simple distillation was carried out at a pressure of 270 Pa. The composition obtained was analyzed in the same method as in Example 1.

Examples 3, 4 and Comparative Example 5

Compositions of Examples 3, 4 and Comparative Example 5 were prepared by mixing dodecamethylpentasiloxane with decamethyltetrasiloxane or octamethyltrisiloxane in a wt % as seen in Table 2. The dodecamethylpentasiloxane, decamethyltetrasiloxane and octamethyltrisiloxane had been isolated by distillation from the redistribution reaction product described in Example 1.

The compositions and properties are as shown in Table 2.

TABLE 2

Properties of Dimethylpolysiloxane Compositions

| | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| dimethylpolysiloxane (wt %) | | | | | | | | | | |
| $M_2D_3$* | 18 | 25 | 30 | 30 | | | | | 10 | |
| $M_2D_3$** | | | | | | | | | | 100 |
| $M_2D_3$*** | | | | | | | | 100 | | |
| $M_2$ | 2 | 1 | | | 100 | | | | | |
| $M_2D$ | 15 | 11 | | 70 | | 100 | | | | |
| $M_2D_2$ | 25 | 27 | 70 | | | | 100 | | 90 | |
| $M_2D_4$ | 7 | 12 | | | | | | | | |
| $M_2D_5$ | 3 | 4 | | | | | | | | |
| $M_2D_6$ | 1 | 2 | | | | | | | | |
| D4 | 17 | 10 | | | | | | | | |
| D5 | 10 | 7 | | | | | | | | |
| D6 | 2 | 1 | | | | | | | | |
| Properties of composition | | | | | | | | | | |
| viscosity(25° C., mm²/s) | 1.9 | 2.0 | 1.65 | 1.3 | 0.65 | 1.0 | 1.5 | 2.0 | 1.55 | 2.0 |
| viscosity(-100° C., mm²/s) | 148 | 148 | 100 | 80 | NG | NG | NG | NG | NG | 336 |
| pour point (° C.) | -118 | -118 | -114 | -114 | -77 | -100 | -95 | -86 | -91 | -107 |
| freezing point (° C.) | -120 | -120 | -118 | -116 | -70 | -90 | -95 | -87 | -92 | -107 |
| moisture content(ppm) | 20 | 20 | 20 | 20 | 20 | 20 | 20 | 200 | 20 | 50 |
| production per hour | A | A | B | B | B | B | B | C | B | C |

In the Table 2, the ratings, A, B, and C, of the production per hour mean as follows:
A: a production per hour 10 times or more as much as that of dodecamethylpentasiloxane,
B: a production per hour 3 to 10 times as much as that of dodecamethylpentasiloxane,
C: a production per hour 1 to 3 times as much as that of dodecamethylpentasiloxane.

In the table 2, the ratings, A, B, and C, of the production per hour mean as follows:

A: a production per hour 10 times or more as much as that of dodecamethylpentasiloxane, B: a production per hour 3 to 10 times as much as that of dodecamethylpentasiloxane, C: a production per hour 1 to 3 times as much as that of dodecamethylpentasiloxane.

As shown in Table 2, the present composition makes use of low viscosity and high production of dimethylpolysiloxanes other than dodecametylpentasiloxane, while taking advantage of the low-temperature properties of dodecametylpentasiloxane. The present composition is suitable for an industrial refrigerant.

What is claimed is:

1. A dimethylpolysiloxane composition comprising at least two dimethylpolysiloxanes selected from dimethylpolysiloxanes represented by formula (1) or formula (2),

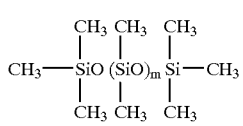
(1)

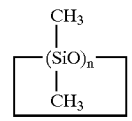
(2)

wherein m is an integer with $0 \leq m \leq 10$ and n is an integer with $3 \leq n \leq 10$, one of said at least two dimethylpolysiloxanes is dodecamethylpentasiloxane contained in an amount of 15 to 95 wt % based on a total weight of the composition, and the composition has a moisture content of at most 50 ppm based on the total weight of the composition, a viscosity of 2 mm²/s or smaller at 25 degrees C. and a viscosity of 300 mm²/s or smaller at -100 degrees C.

2. The dimethylpolysiloxane composition according to claim 1, wherein the composition has a freezing point of -110 degrees C. or lower.

3. The dimethylpolysiloxane composition according to claim 1 or 2, wherein the composition comprises at least 1 wt %, based on the total weight of the composition, of the cyclic dimethylpolysiloxane represented by the formula (2).

4. A refrigerant for an apparatus comprising the composition according to claim 1 or 2.

* * * * *